United States Patent
Yanagawa et al.

(10) Patent No.: US 10,829,086 B2
(45) Date of Patent: Nov. 10, 2020

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Shinichi Okubo, Aichi (JP); Takahiro Tanaka, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 254 days.

(21) Appl. No.: 16/075,707

(22) PCT Filed: Jan. 18, 2017

(86) PCT No.: PCT/JP2017/001612
§ 371 (c)(1),
(2) Date: Aug. 6, 2018

(87) PCT Pub. No.: WO2017/138316
PCT Pub. Date: Aug. 17, 2017

(65) Prior Publication Data
US 2020/0207305 A1    Jul. 2, 2020

(30) Foreign Application Priority Data
Feb. 10, 2016   (JP) .................................. 2016-023499

(51) Int. Cl.
*B60R 22/46* (2006.01)
(52) U.S. Cl.
CPC ................. *B60R 22/4628* (2013.01)

(58) Field of Classification Search
CPC ............................ B60R 22/46; B60R 22/4628
See application file for complete search history.

(56) References Cited

U.S. PATENT DOCUMENTS 6,823,796 B1 * 11/2004 Amano ............... B60R 22/4628
102/202.14
2006/0218918 A1   10/2006 Hirooka et al.
(Continued)

FOREIGN PATENT DOCUMENTS

| DE | 102013205371 A1 | 4/2014 |
|---|---|---|
| JP | 2006256396 A | 9/2006 |

(Continued)

OTHER PUBLICATIONS

International Search Report and Written Opinion issued in the corresponding application PCT/JP2017/001612 dated Mar. 7, 2017.

*Primary Examiner* — Sang K Kim
(74) *Attorney, Agent, or Firm* — Roberts Calderon Safran & Cole P.C.

(57) ABSTRACT

A webbing take-up device includes a spool that takes up webbing worn by an occupant by being rotated in a take-up direction, and a pretensioner mechanism. The pretensioner mechanism includes a gas generator that includes a gas-generating-agent-storing portion and an ignition-device-storing portion, and a cylinder to which the gas generator is attached and that includes a second tubular portion into which gas generated by the gas generator is supplied. A discharge hole, through which gas supplied to the second tubular portion is discharged, is formed in a portion of the cylinder where the ignition-device-storing portion is disposed.

5 Claims, 14 Drawing Sheets

(56) References Cited

U.S. PATENT DOCUMENTS

2012/0212030 A1  8/2012  Hodatsu et al.
2014/0102329 A1  4/2014  Yang

FOREIGN PATENT DOCUMENTS

| JP | 2007-196977 A | 8/2007 |
| JP | 2012171445 A | 9/2012 |
| JP | 2012224158 A | 11/2012 |

* cited by examiner

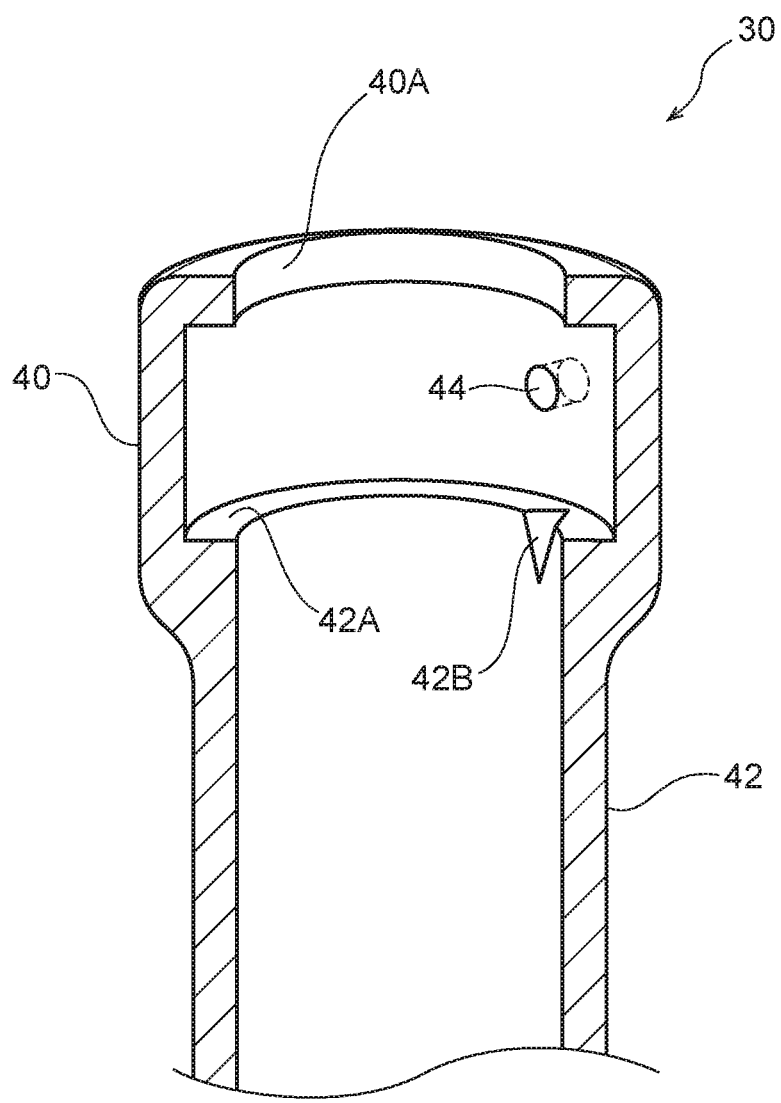

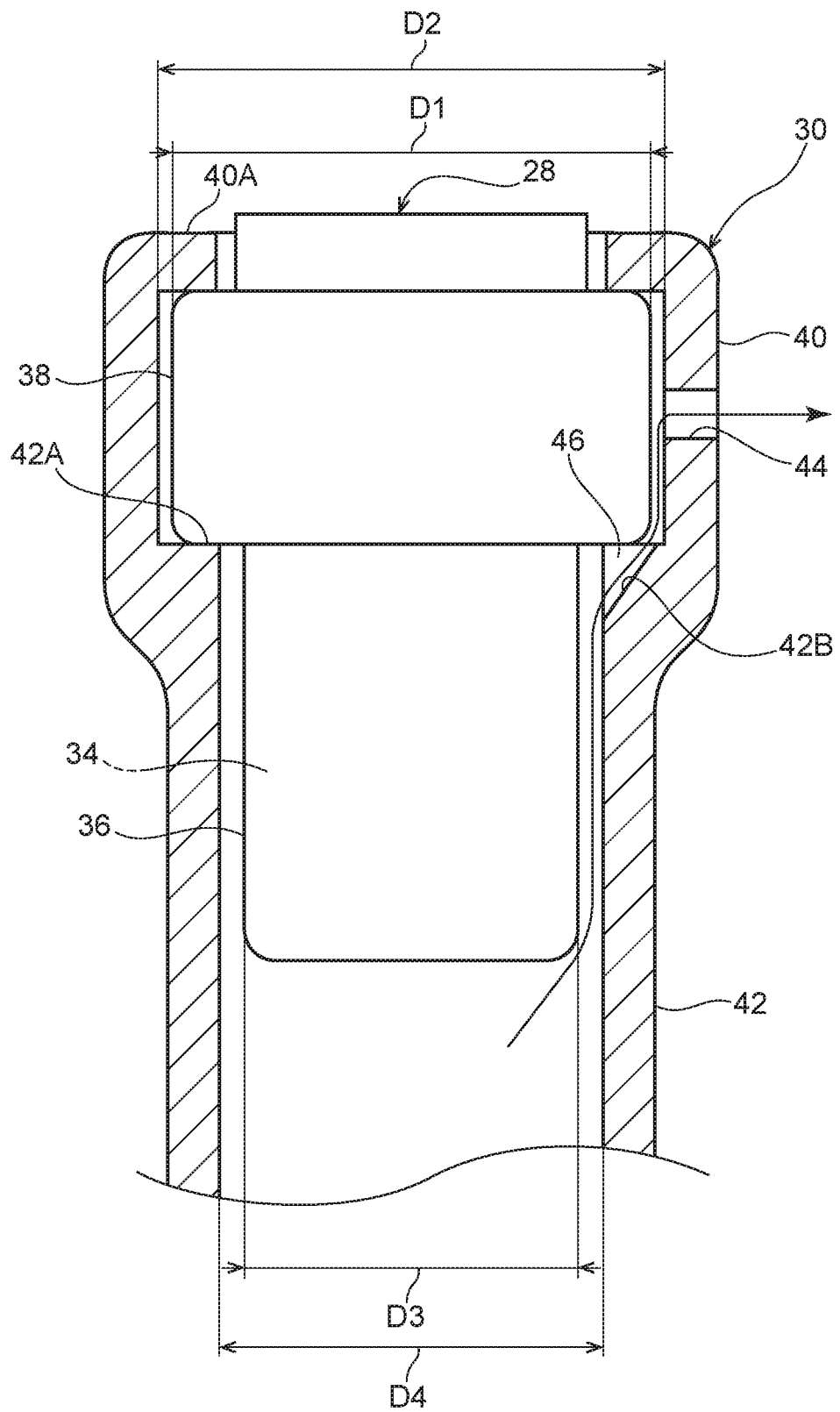

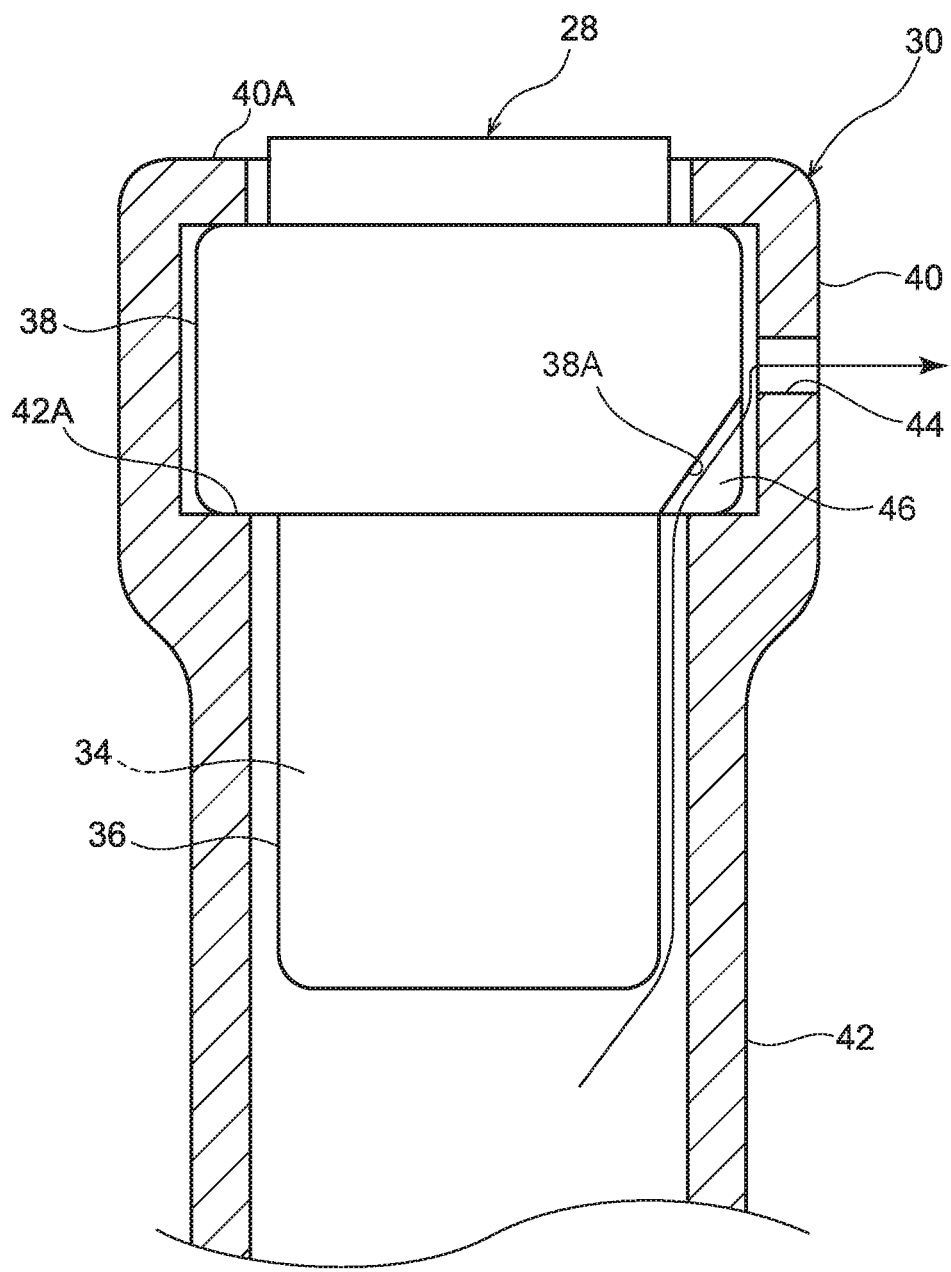

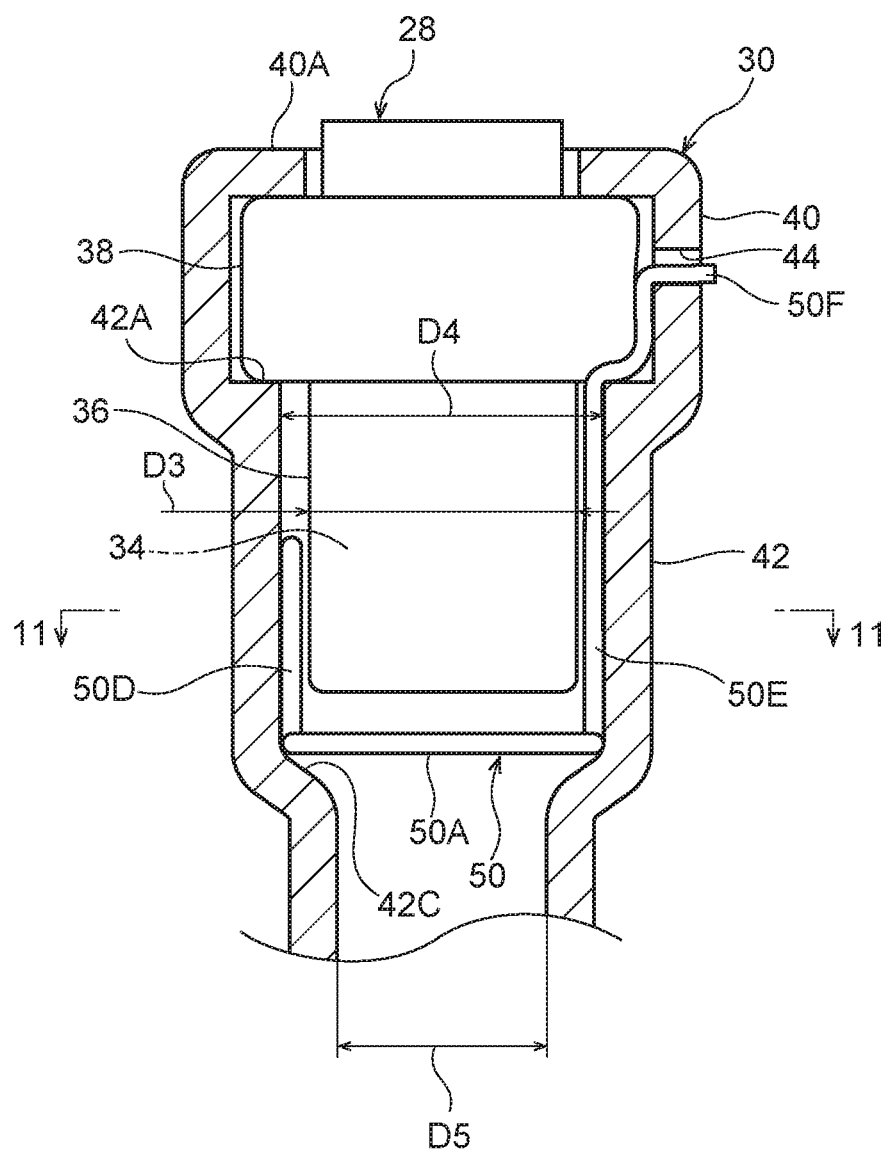

WEBBING TAKE-UP DEVICE

CROSS-REFERENCE TO RELATED APPLICATIONS

The present application is a U.S. National Phase of PCT/JP2017/001612 filed on Jan. 18, 2017, claiming priority to Japanese Patent Application No. 2016-023499 filed Feb. 10, 2016. The disclosure of the PCT Application is hereby incorporated by reference into the present Application.

TECHNICAL FIELD

The present invention relates to a webbing take-up device.

BACKGROUND ART

Japanese Patent Application Laid-Open (JP-A) No. 2012-171445 discloses a pretensioner that is actuated in a vehicle emergency to rotate a spool in a seatbelt take-up direction, and a seatbelt device configured including this pretensioner.

In the pretensioner described in JP-A No. 2012-171445, an exhaust hole is formed in a pipe into which gas generated by a gas generator is supplied. This exhaust hole is closed off by a stopper member. Pressing on the stopper member from the outside of the pipe after the pretensioner has been actuated allows gas supplied into the pipe to be discharged therefrom. In such a seatbelt device configured including a pretensioner actuated by pressure from gas generated by a gas generator, it is desirable to be able to discharge gas remaining in the pipe after the pretensioner has been actuated.

In the pretensioner described in JP-A No. 2012-171445, an exhaust hole is formed in a portion opposing a case in which a gas-generating agent is stored. Accordingly, gas discharge through the discharge hole is blocked by expansion of the case, making it difficult to control the amount of gas discharged.

SUMMARY OF INVENTION

Technical Problem

In consideration of the above circumstances, an object of the present invention is to obtain a webbing take-up device capable of discharging residual gas after a pretensioner mechanism has been actuated.

Solution to Problem

A webbing take-up device of a first aspect of the present disclosure includes a spool that takes up webbing worn by an occupant by being rotated in a take-up direction, and a pretensioner mechanism. The pretensioner mechanism includes: a gas generator that includes a gas-generating-agent-storing portion in which a gas-generating agent is stored, and an ignition-device-storing portion provided with an ignition device that ignites the gas-generating agent; a gas-generator-attached portion to which the gas generator is attached, and that includes a gas-supplied portion into which gas generated by the gas generator is supplied; and a discharge portion that is provided to a portion of the gas-generator-attached portion where the ignition-device-storing portion is disposed, and through which gas supplied into the gas-supplied portion is discharged. The pretensioner mechanism is configured to rotate the spool in the take-up direction due to actuation of the gas generator in a vehicle emergency.

A webbing take-up device of a second aspect of the present disclosure is the webbing take-up device of the first aspect, wherein a portion of the gas-generator-attached portion where the gas generator is attached is formed in a tubular shape having one open end, and the ignition-device-storing portion is fixed in a state held between a swaged portion formed at the one end side of the gas-generator-attached portion and part of the gas-generator-attached portion.

A webbing take-up device of a third aspect of the present disclosure is the webbing take-up device of the first aspect or the second aspect, wherein at least one of the gas-generator-attached portion or the gas generator is provided with a discharge-path-forming portion that forms a discharge path through which gas supplied into the gas-supplied portion is passed to the discharge portion.

A webbing take-up device of a fourth aspect of the present disclosure is the webbing take-up device of any one of the first aspect to the third aspect, wherein a discharge-path-forming member is provided between the gas generator and the gas-generator-attached portion to form a discharge path through which gas supplied into the gas-supplied portion is passed to the discharge portion.

A webbing take-up device of a fifth aspect of the present disclosure is the webbing take-up device of the third aspect, wherein the discharge-path-forming portion is configured by a depression portion formed in at least one of the gas-generator-attached portion or the gas generator, and the discharge path is formed between the depression portion and either the gas generator or the gas-generator-attached portion.

A webbing take-up device of a sixth aspect of the present disclosure is the webbing take-up device of the fourth aspect, wherein the discharge portion is configured by a discharge hole through which the inside and the outside of the gas-generator-attached portion are in communication, and at least a portion of the discharge-path-forming member is disposed spanning from the gas-supplied portion to the discharge hole.

Advantageous Effects of Invention

In the webbing take-up device of the first aspect of the present disclosure, the gas generator is actuated in a vehicle emergency. Namely, the ignition device provided to the ignition-device-storing portion is actuated such that the gas-generating agent is ignited. This causes combustion of the gas-generating agent and the pressure in the gas-generating-agent-storing portion to rise. Then, the gas-generating-agent-storing portion ruptures, and combustion gas from inside the gas-generating-agent-storing portion arising from the combustion of the gas-generating agent is supplied into the gas-supplied portion of the gas-generator-attached portion. As a result, the spool is rotated in the take-up direction such that the webbing is taken up onto the spool. Further, gas supplied from the gas generator into the gas-supplied portion of the gas-generator-attached portion is also discharged from inside the gas-supplied portion through the discharge portion. In the first aspect of the present disclosure, the discharge portion is provided to a portion of the gas-generator-attached portion where the ignition-device-storing portion is disposed. This suppresses the discharge of gas from the gas generator supplied into the gas-supplied portion through the discharge portion from being obstructed by deformation of the generating-agent-storing portion. The first aspect of the present disclosure thus enables residual gas to be discharged after the pretensioner mechanism has been actuated.

In the webbing take-up device of the second aspect of the present disclosure, swaging an open-end-side portion of the gas-generator-attached portion (by forming a swaged portion) enables the gas generator to be fixed to the gas-generator-attached portion and enables the open end of the generator-attached portion to be closed off.

In the webbing take-up device of the third aspect of the present disclosure, gas from the gas generator supplied into the gas-supplied portion of the gas-generator-attached portion is discharged from inside of the gas-supplied portion through the discharge path and the discharge portion. In the third aspect of the present disclosure, providing the discharge-path-forming portion to at least one of the gas-generator-attached portion or the gas generator enables residual gas to be discharged after the pretensioner mechanism has been actuated.

In the webbing take-up device of the fourth aspect of the present disclosure, gas from the gas generator supplied into the gas-supplied portion of the gas-generator-attached portion is discharged from inside of the gas-supplied portion through the discharge path and the discharge portion. In the fourth aspect of the present disclosure, the discharge-path-forming member is provided between the gas generator and the gas-generator-attached portion. The discharge path, through which gas from the gas generator supplied into the gas-supplied portion is discharged, is thereby able to be formed between the gas generator and the gas-generator-attached portion, enabling residual gas to be discharged after the pretensioner mechanism has been actuated.

In the webbing take-up device of the fifth aspect of the present disclosure, forming the depression portion in at least one of the gas-generator-attached portion and the gas generator enables the discharge path for discharging residual gas inside the gas-supplied portion of the gas-generator-attached portion to be easily formed.

In the webbing take-up device of the sixth aspect of the present disclosure, at least a portion of the discharge-path-forming member is disposed spanning from the gas-supplied portion of the gas-generator-attached portion to the discharge hole. The discharge path linking the gas-supplied portion and the discharge hole, can thereby be formed between the gas generator and the gas-generator-attached portion, enabling residual gas to be discharged through the discharge path and the discharge hole after the pretensioner mechanism has been actuated.

BRIEF DESCRIPTION OF DRAWINGS

FIG. 7 is a perspective view cross-section corresponding to FIG. 5 illustrating a portion of a cylinder where a gas generator is attached.

FIG. 8 is a cross-section illustrating a gas-generator-attached portion to which a gas generator is attached.

FIG. 9 is a cross-section corresponding to FIG. 8 illustrating a discharge path in another embodiment.

FIG. 10 is a cross-section corresponding to FIG. 8 illustrating a cylinder provided with a discharge-path-forming member and the like.

DESCRIPTION OF EMBODIMENTS

Figure 1:
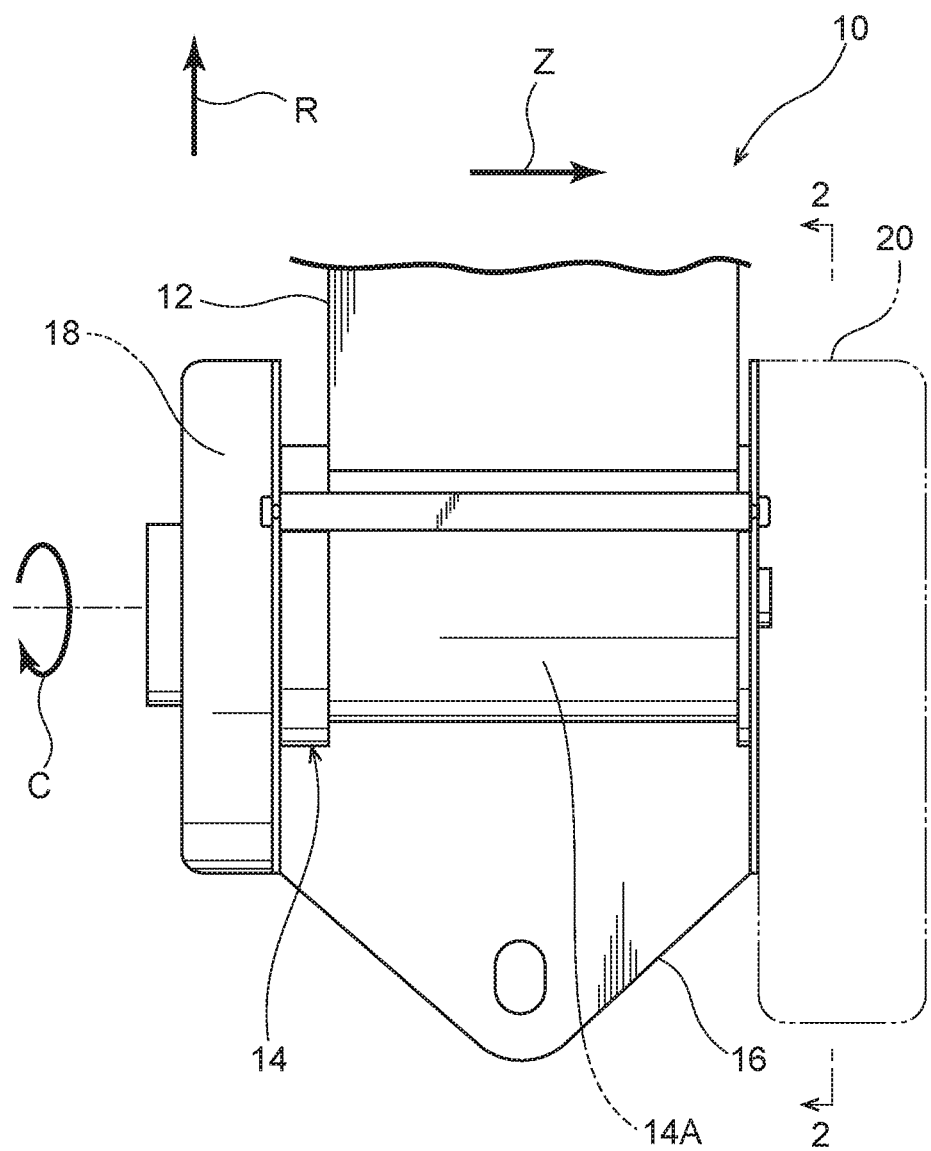
FIG. 1 is a face-on view illustrating a webbing take-up device.

Explanation follows regarding a webbing take-up device according to an exemplary embodiment of the present invention, with reference to FIG. 1 to FIG. 4. Note that in the drawings, the arrow Z direction, the arrow R direction, and the arrow C direction respectively indicate a spool rotation axis direction, a spool rotation radial direction), and a spool rotation circumferential direction, as appropriate. Further, in the following, unless specifically stated otherwise, simple reference to the axial direction, the radial direction, or the circumferential direction refers to the spool rotation axis direction, the spool rotation radial direction, or the spool rotation circumferential direction.

As illustrated in FIG. 1, a webbing take-up device 10 of the present exemplary embodiment includes a spool 14 that takes up webbing 12 worn by an occupant and that rotates in a pull-out direction when the webbing 12 is pulled out, and a frame 16 that rotatably supports the spool 14. The webbing take-up device 10 also includes a lock mechanism 18 that restricts rotation of the spool 14 in the pull-out direction in a vehicle emergency (for example, upon rapid pull-out of the webbing 12 from the spool 14 or sudden vehicle deceleration in a vehicle collision), and a pretensioner mechanism 20 that forcibly rotates the spool 14 in a take-up direction in a vehicle emergency.

The spool 14 includes a take-up portion 14A that is formed in a substantially cylindrical bar shape. A base end of the elongated belt shaped webbing 12 is taken up on the take-up portion 14A. The webbing 12 extends toward the upper side of the frame 16 so as to be wearable by an occupant seated in a vehicle seat (not illustrated in the drawings). Rotating the spool 14 in the take-up direction toward an other circumferential direction side (the opposite direction to the direction of arrow C) causes the webbing 12 to be taken up onto the spool 14, and pulling out the webbing 12 from the spool 14 rotates the spool 14 toward one circumferential direction side (the arrow C direction), namely, rotates the spool 14 in the pull-out direction.

The lock mechanism 18 restricts pull-out direction rotation of the spool 14 in a vehicle emergency, and is provided at an other axial direction side (the opposite side to the arrow Z direction) of the spool 14. The pretensioner mechanism 20 is provided at one axial direction side (the arrow Z direction side) of the spool 14. The pretensioner mechanism 20 forcibly rotates the spool 14 in the take-up direction in a vehicle emergency to eliminate slack in the webbing 12 worn by the occupant.

Figure 2:
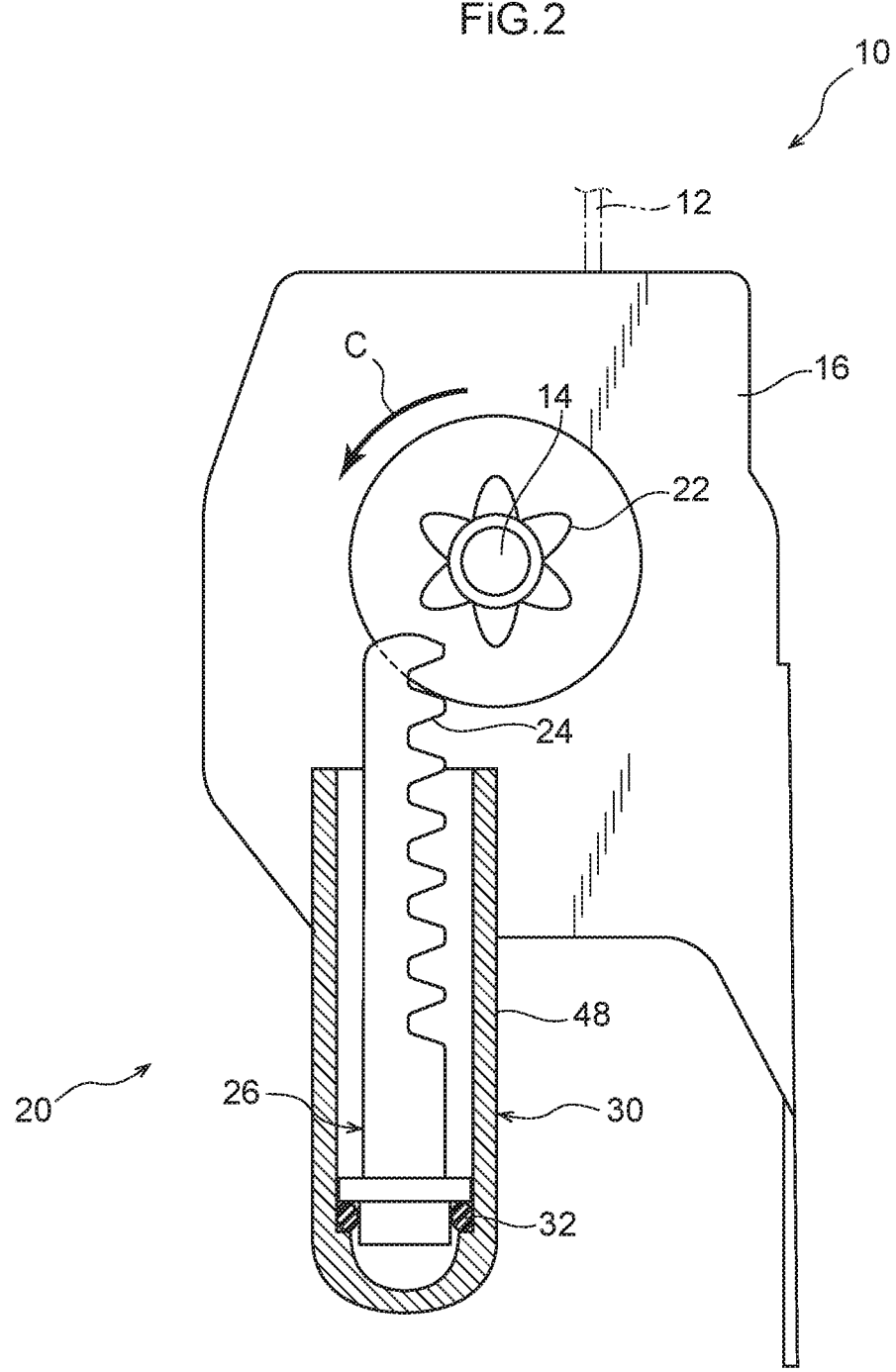
FIG. 2 is a cross-section illustrating a section of a pretensioner mechanism taken along line 2-2 illustrated in FIG. 1.

As illustrated in FIG. 2, the pretensioner mechanism 20 of the present exemplary embodiment is a rack-and-pinion pretensioner mechanism. The pretensioner mechanism 20 is configured including a pinion 22 that is provided at a portion on the one axial direction side of the spool 14 so as to be capable of rotating as a unit together with the spool 14, a piston 26 that includes a rack 24 that engages the pinion 22, a gas generator 28 that rapidly generates high pressure gas when actuated (see FIG. 3), and a cylinder 30 to which the gas generator 28 is attached and that serves as a gas-generator-attached portion for housing the piston 26.

An O-ring 32 is fitted to a lower portion of the piston 26. The O-ring 32 is in close contact with an inner wall of the cylinder 30 (a third tubular portion 48). Gas supplied from the gas generator 28 into the cylinder 30 is thereby prevented from escaping upward (toward the pinion 22) through a gap between the piston 26 and the cylinder 30.

Figure 3:
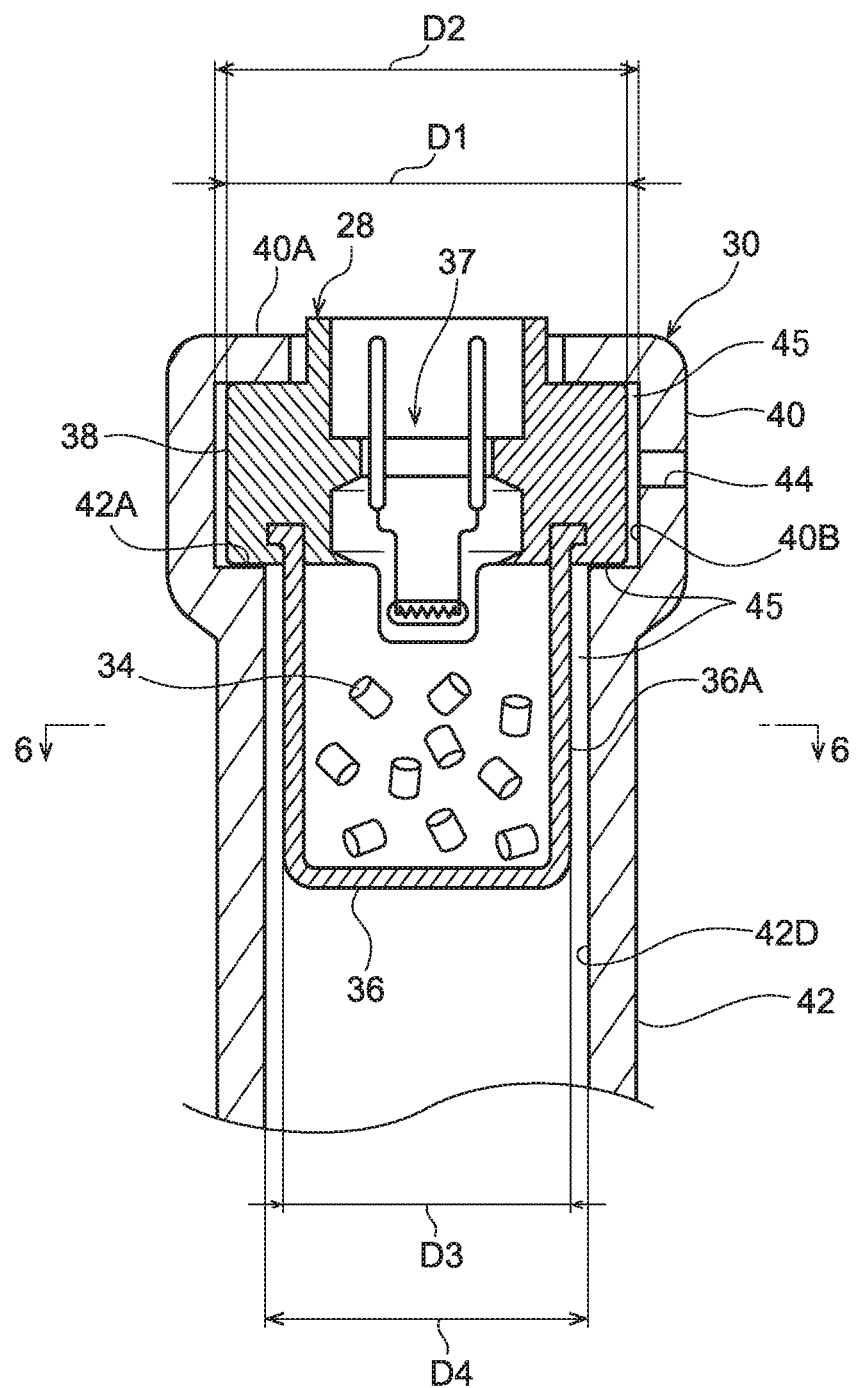
FIG. 3 is a cross-section illustrating a portion of a cylinder where a gas generator is attached.

As illustrated in FIG. 3, the gas generator 28 includes a gas-generating-agent-storing portion 36 and an ignition-device-storing portion 38. The gas-generating-agent-storing portion 36 is in the shape of a bottomed cylindrical tube and is filled with a gas-generating agent 34. The ignition-device-storing portion 38 includes an ignition device 37 that generates heat when powered on. The gas-generating agent 34 ignites when heat is generated by the ignition device 37. Combustion of the gas-generating agent 34 filled into the gas-generating-agent-storing portion 36 causes high pressure gas to be rapidly generated. The gas-generating-agent-storing portion 36 expands and deforms, then ruptures, due to the pressure of gas generated inside the gas-generating-agent-storing portion 36. High-temperature and high-pressure gas flowing out from the gas-generating-agent-storing portion 36 is supplied into the cylinder 30 (a second tubular portion 42). Note that the rigidity of the ignition-device-storing portion 38 is such that it is not deformed by high-temperature and high-pressure gas flowing out of the gas-generating-agent-storing portion 36, or such that deformation of the ignition-device-storing portion 38 is negligibly small.

Figure 4:
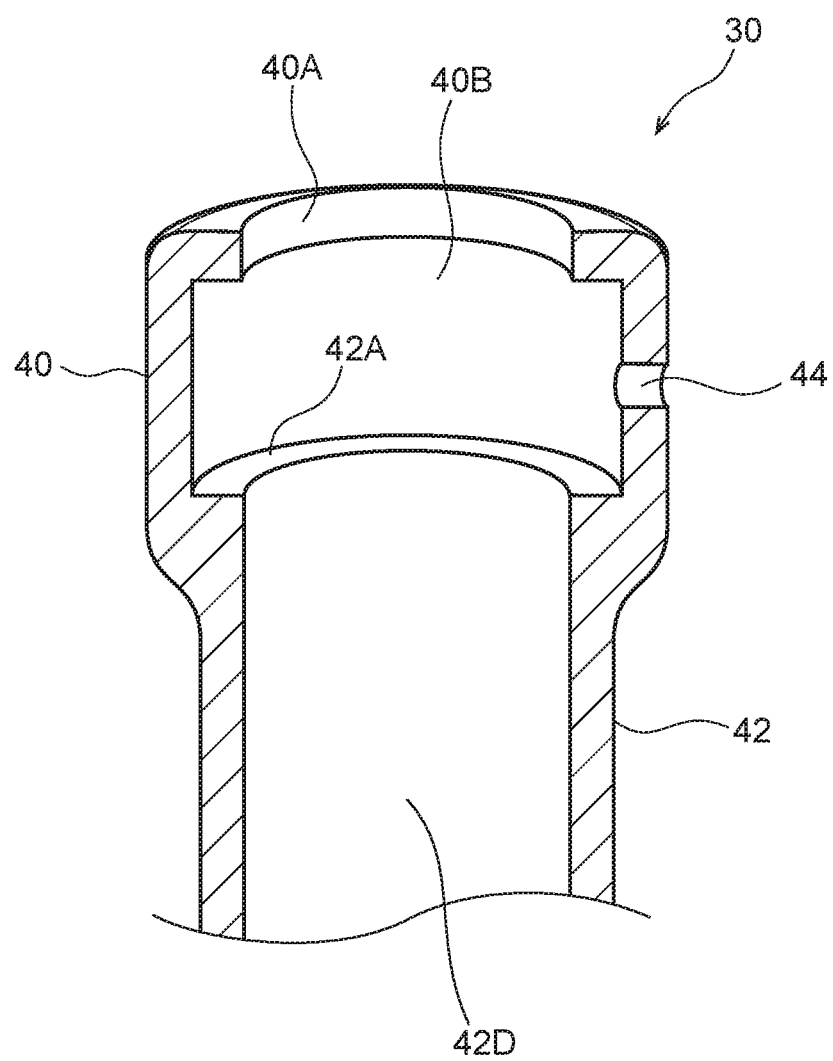
FIG. 4 is a perspective view cross-section illustrating a portion of a cylinder where a gas generator is attached.

As illustrated in FIG. 3 and FIG. 4, the cylinder 30 includes a first tubular portion 40 and the second tubular portion 42. The first tubular portion 40 is formed in the shape of a cylindrical tube with an inner diameter D2, this being larger than an outer diameter D1 of the ignition-device-storing portion 38 of the gas generator 28. The second tubular portion 42 serves as a gas-supplied portion, is disposed coaxially with the first tubular portion 40, and is formed in the shape of a cylindrical tube with an inner diameter D4, this being both smaller than the inner diameter D2 of the first cylindrical tube portion and larger than an outer diameter D3 of the gas-generating-agent-storing portion 36 of the gas generator 28. Due to the inner diameter D2 of the first tubular portion 40 being larger than the outer diameter D1 of the ignition-device-storing portion 38 of the gas generator 28, a passage 45 is formed between the first tubular portion 40 and the ignition-device-storing portion 38 through which gas is able to pass through. In a state in which the ignition-device-storing portion 38 and the gas-generating-agent-storing portion 36 of the gas generator 28 are respectively disposed to the radial direction inside of the first tubular portion 40 and the second tubular portion 42, an open-end-side portion 40A of the first tubular portion 40 is swaged, resulting in a state in which the ignition-device-storing portion 38 is held between the open-end-side portion 40A of the first tubular portion 40 and an end face 42A on the first tubular portion 40 side of the second tubular portion 42. The gas generator 28 is thereby attached (fixed) to an end portion on one side of the cylinder 30. Note that the portion that has been swaged is also referred to as a swaged portion 40A. The first tubular portion 40 is also formed with a discharge hole 44 serving as a discharge portion that places the inside and the outside of the cylinder 30 in communication with each other.

As illustrated in FIG. 3, the end face 42A on the first tubular portion 40 side of the second tubular portion 42 abuts the ignition-device-storing portion 38 of the gas generator 28. A passage 45 formed between the end face 42A on the first tubular portion 40 side of the second tubular portion 42 and the ignition-device-storing portion 38 of the gas generator 28 is made up of slight gaps through which gas is able to pass that arise due to the surface roughness and the like of the two surfaces. When an outer circumferential face 36A of the gas-generating-agent-storing portion 36 makes contact with an inner circumferential face 42D of the second tubular portion 42 due to expansion of the gas-generating-agent-storing portion 36, a passage 45 made up of slight gaps through which gas is able to pass that arise due to the surface roughness and the like of the two surfaces is formed between the outer circumferential face 36A of the gas-generating-agent-storing portion 36 and the inner circumferential face 42D of the second tubular portion 42.

As illustrated in FIG. 2, the cylinder 30 is also provided with the third tubular portion 48, which is formed in the shape of a cylindrical tube that is bent so as to extend upward from an end portion of the second tubular portion 42 on the opposite side to the first tubular portion 40. The piston 26 is housed inside the third tubular portion 48.

Operation and Advantageous Effects of the Present Exemplary Embodiment

Explanation follows regarding the operation and advantageous effects of the present exemplary embodiment.

As illustrated in FIG. 1, in the present exemplary embodiment, the webbing 12 is worn over the body of a vehicle occupant by pulling the webbing 12 out from the spool 14.

In a state in which the webbing 12 is worn over the body of a vehicle occupant, actuation of the lock mechanism 18 in a vehicle emergency restricts pull-out direction rotation of the spool 14. As a result, pull-out of the webbing 12 from the spool 14 is restricted, and the body of the occupant attempting to move toward the vehicle front is restrained by the webbing 12.

As illustrated in FIG. 3, in a vehicle emergency, when gas generated by the gas generator 28 is supplied into the second tubular portion 42 of the cylinder 30 due to actuation of the gas generator 28, the piston 26 housed within the third tubular portion 48 linked to the second tubular portion 42 moves upward as illustrated in FIG. 2. The rack 24 of the moved piston 26 then engages the pinion 22 such that the pinion 22 is rotated in the take-up direction. The spool 14 is thereby rotated through a predetermined number of revolutions in the take-up direction such that a predetermined length of the webbing 12 is taken up on the spool 14. As a result, slack in the webbing 12 worn by the occupant is eliminated and restraint force on the occupant from the webbing 12 is increased.

As illustrated in FIG. 3, gas is discharged to the outside of the cylinder 30 through the passage 45 (slight gaps) formed between the outer circumferential face 36A of the gas-generating-agent-storing portion 36 and the inner circumferential face 42D of the second tubular portion 42, the passage 45 (slight gaps) formed between the end face 42A on the first tubular portion 40 side of the second tubular portion 42 and the ignition-device-storing portion 38 of the gas generator 28, the passage 45 formed between the first tubular portion 40 and the ignition-device-storing portion 38, and the discharge hole 44 formed in the first tubular portion 40. The gas pressure inside the cylinder 30 can thereby be made substantially equal to the gas pressure outside the cylinder 30 (atmospheric pressure) after a predetermined amount of time has passed after actuation of the gas generator 28. Namely, in the present exemplary embodiment, residual gas inside the cylinder 30 is able to be discharged after the pretensioner mechanism 20 has been actuated, even in cases in which gas inside the cylinder 30 is prevented from escaping toward the pinion 22.

Figure 5:
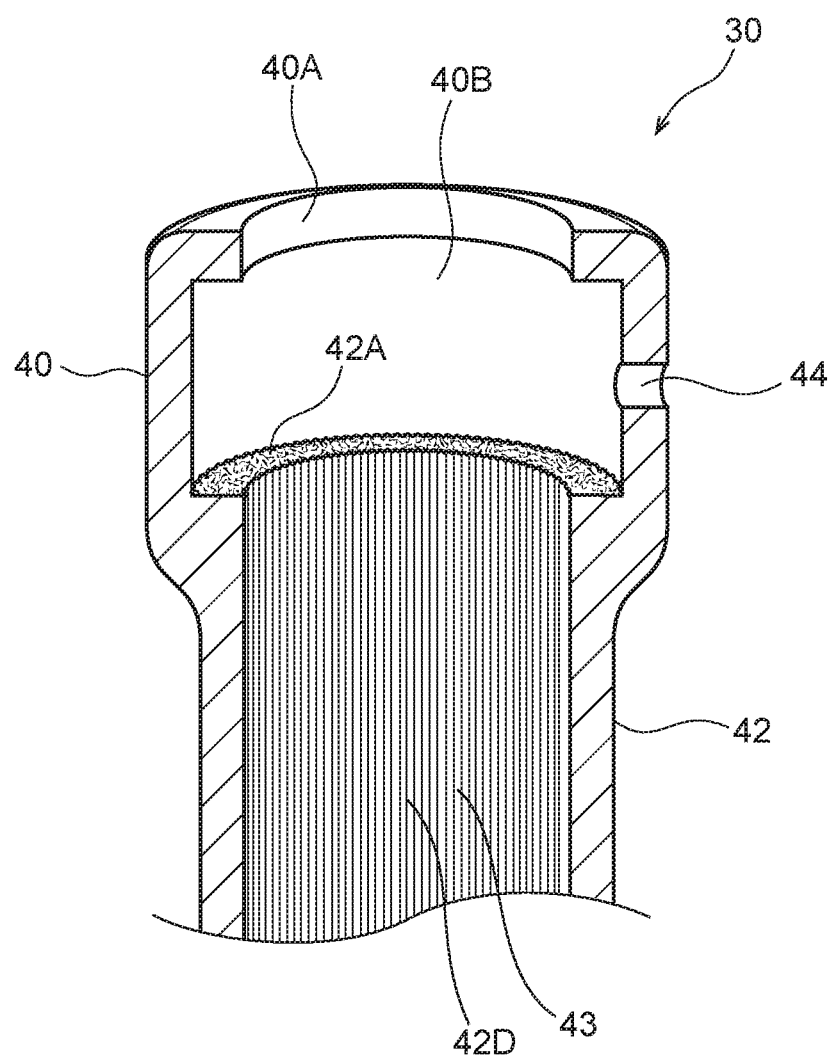
FIG. 5 is a perspective view cross-section illustrating a portion of a cylinder where a gas generator is attached.
Figure 6:
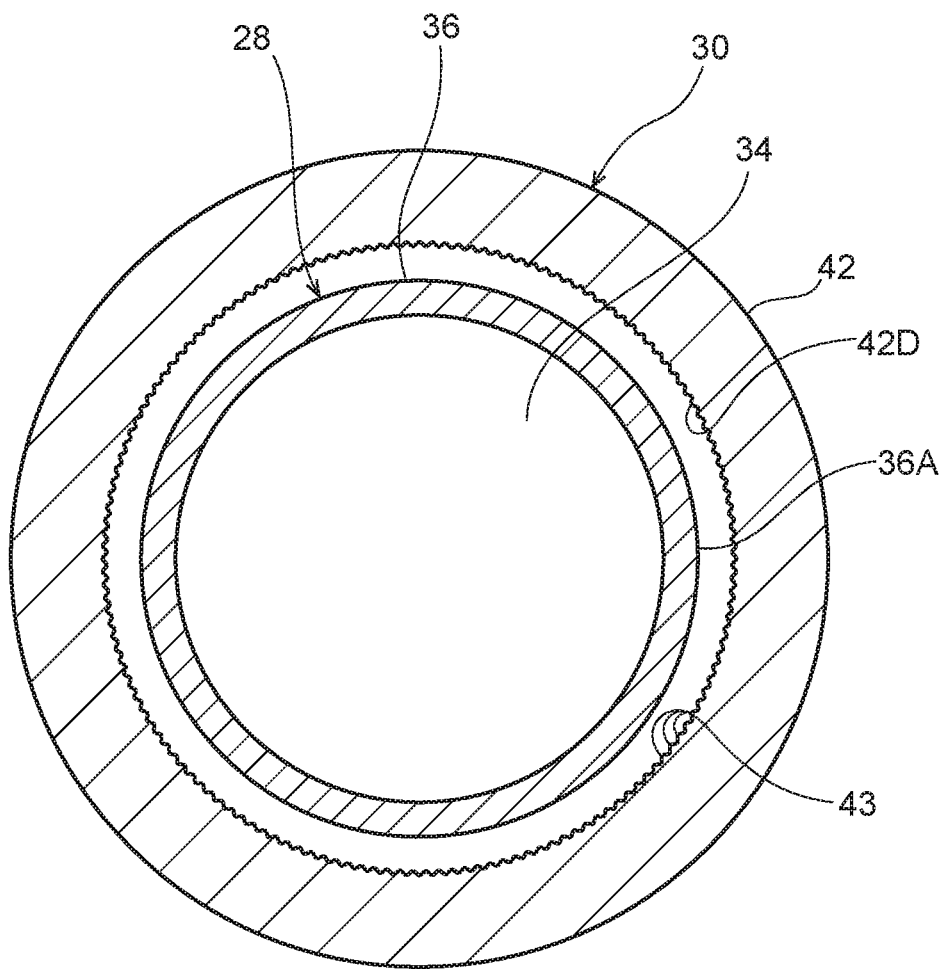
FIG. 6 is a cross-section illustrating a section of the cylinder and gas generator in FIG. 5 taken along a line corresponding to line 6-6 illustrated in FIG. 3.
Figure 11A:
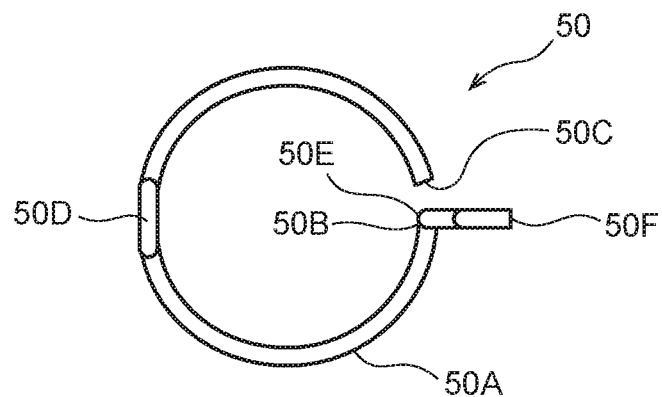
FIG. 11A is a plan view illustrating a discharge-path-forming member.
Figure 11B:
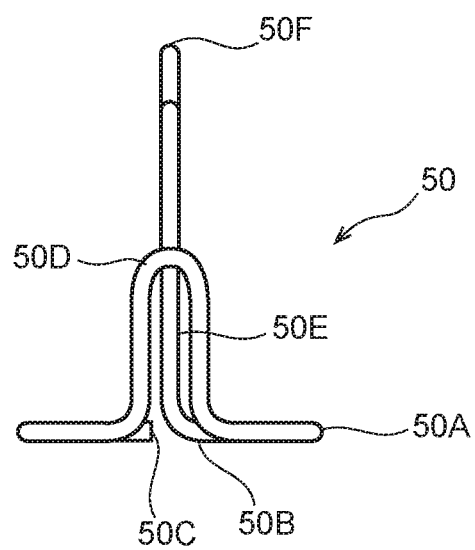
FIG. 11B is a side view illustrating a discharge-path-forming member as seen from another direction.
Figure 11C:
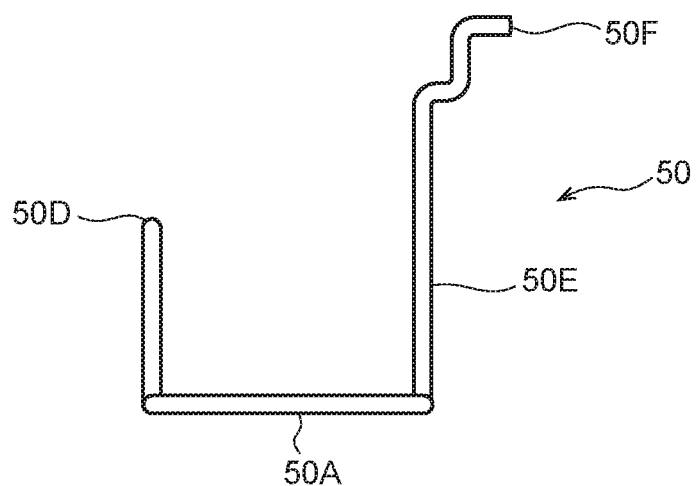
FIG. 11C is a side view a discharge-path-forming member as seen from another direction.

In the present exemplary embodiment, gaps for discharging gas supplied from the gas generator 28 into the cylinder 30 are able to be formed between the cylinder 30 and the gas generator 28 without having to provide any additional components, enabling cost to be reduced. Further, in the present exemplary embodiment, the pressure to move the piston 26 using gas supplied into the cylinder 30 and the discharge characteristics of gas from the gas generator 28 can be easily adjusted by adjustment of the surface roughness of the inner circumferential face 42D of the second tubular portion 42 and the end face 42A on the first tubular portion 40 side of the second tubular portion 42. As an example, as illustrated in FIG. 5, additional processing may be performed on the end face 42A on the first tubular portion 40 side of the second tubular portion 42 such that the surface roughness of the end face 42A is rougher than the surface roughness of an inner circumferential face 40B of the first tubular portion 40. For example, the end face 42A on the first tubular portion 40 side of the second tubular portion 42 may be filed or blasted with shot. Further, as illustrated in FIG. 6, additional processing may be similarly performed such that the surface roughness of the inner circumferential face 42D of the second tubular portion 42 is rougher than the surface roughness of the inner circumferential face 40B of the first tubular portion 40. For example, the inner circumferential face 42D of the second tubular portion 42 may be filed or machined. Note that configuration may be such that the entire inner circumferential face of the cylinder 30 is a roughened surface, thus forming slight gaps through which gas is able to pass between the end face 42A on the first tubular portion 40 side of the second tubular portion 42 and the ignition-device-storing portion 38 of the gas generator 28, and between the outer circumferential face 36A of the gas-generating-agent-storing portion 36 and the inner circumferential face 42D of the second tubular portion 42.

Moreover, in the present exemplary embodiment, the discharge hole 44 is provided to a portion (the first tubular portion 40) of the cylinder 30 where the ignition-device-storing portion 38 is disposed that is not affected, or not liable to be affected, by high-temperature and high-pressure gas. It is thereby possible to suppress the discharge of gas from the gas generator supplied into the second tubular portion 42 of the cylinder 30 through the discharge hole 44 from being obstructed by deformation of the gas-generating-agent-storing portion 36.

Further, in the present exemplary embodiment, swaging the open-end-side portion 40A of the first tubular portion 40 (forming a swaged portion 40A) enables the gas generator 28 to be fixed to the cylinder 30 and enables closing off the open end of the cylinder 30. This enables the manufacture of the webbing take-up device 10 to be simplified.
Configuration Including Discharge-Path-Forming Portion Explanation follows regarding configuration including a discharge-path-forming portion that forms a discharge path for discharging gas supplied from the gas generator 28 into the cylinder 30, with reference to FIG. 7 and FIG. 8. Note that the same reference signs as in the above exemplary embodiment are appended to members and portions corresponding to those in the above exemplary embodiment, and explanation thereof may be omitted.

As illustrated in FIG. 7, a depression portion 42B, serving as a discharge-path-forming portion, is formed in an end portion on the first tubular portion 40 side of the second tubular portion 42. As illustrated in FIG. 8, a discharge path 46, through which gas from the gas generator 28 supplied into the second tubular portion 42 passes, is formed between the depression portion 42B and the ignition-device-storing portion 38 of the gas generator 28. Note that the discharge path 46 and the discharge hole 44 are respectively disposed at the same position along the circumferential direction of the first tubular portion 40 and the second tubular portion 42.

The configuration described above enables gas supplied from the gas generator 28 into the second tubular portion 42 of the cylinder 30 to be discharged to the outside of the cylinder 30 through the discharge path 46 formed between a holder 38 of the gas generator 28 and the second tubular portion 42 of the cylinder 30 and through the discharge hole 44 formed in the first tubular portion 40 of the cylinder 30.

In the present exemplary embodiment, the discharge path 46 for discharging gas supplied from the gas generator 28 into the cylinder 30 is able to be formed between the cylinder 30 and the gas generator 28 without having to provide any additional components, enabling costs to be reduced. Further, in the present exemplary embodiment, the pressure to move the piston 26 using gas supplied into the cylinder 30 and the discharge characteristics of gas from the gas generator 28 can be easily adjusted by adjustment of the depth of the depression portion 42B.

Note that although the present exemplary embodiment has been explained using an example in which the discharge path 46 for discharging gas supplied from the gas generator 28 into the cylinder 30 is formed between the cylinder 30 and the gas generator 28 by forming the depression portion 42B in the cylinder 30 side, the present invention is not limited thereto. For example, as illustrated in FIG. 9, the discharge path 46 for discharging gas supplied from the gas generator 28 into the cylinder 30 may be formed between the cylinder 30 and the gas generator 28 by forming a depression portion 38A, serving as a discharge-path-forming portion, in the holder 38 of the gas generator 28. Further, plural discharge paths 46 may be provided by providing the depression portion 42B to the cylinder 30 side and providing the depression portion 38A to the holder 38 of the gas generator 28. Further, the discharge path 46 for discharging gas supplied from the gas generator 28 into the cylinder 30 may be formed between the cylinder 30 and the gas generator 28 by providing a projection or the like that serves as a discharge-path-forming portion in place of a depression portion 42B, 38A.
Configuration Provided with Discharge-Path-Forming Member Explanation follows regarding configuration provided with a discharge-path-forming member 50 for forming discharge paths 46 for discharging gas supplied from the gas generator 28 into the cylinder 30. Note that the same reference signs as in the above exemplary embodiments are appended to members and portions corresponding to those in the above exemplary embodiments, and explanation thereof may be omitted.

As illustrated in FIG. 10, a discharge-path-forming member 50 is formed by bending a linear member (a wire-like member) formed from steel or the like. The discharge-path-forming member 50 is provided between the gas generator 28 and the first tubular portion 40 and the second tubular portion 42 of the cylinder 30. Note that in the present exemplary embodiment, a stepped portion 42C is formed to a part of the second tubular portion 42 on the side of the third tubular portion 48 (see FIG. 2). An inner diameter D5 at a part of the second tubular portion 42 on the third tubular portion 48 side of a portion where the gas-generating-agent-storing portion 36 of the gas generator 28 is inserted is thus dimensioned smaller than the outer diameter D3 of the gas-generating-agent-storing portion 36 of the gas generator 28.

As illustrated in FIG. 10 and FIG. 11A to FIG. 11C, the discharge-path-forming member 50 is curved in substantially a C-shape and includes a catch portion 50A that catches on the stepped portion 42C formed in the second tubular portion 42 of the cylinder 30. The discharge-path-forming member 50 also includes a U-shaped portion 50D that projects out toward the gas generator 28 from an intermediate portion between an end 50B on one side of the catch portion 50A and an end 50C on an other side of the catch portion 50A. The U-shaped portion 50D is formed in substantially a U-shape, and is disposed between the outer circumferential face of the gas-generating-agent-storing portion 36 of the gas generator 28 and the inner circumferential face of the second tubular portion 42. The discharge-path-forming member 50 also includes a discharge-path-securing portion 50E that extends toward the open end of the first tubular portion 40 from the one end 50B side of the catch portion 50A. The discharge-path-securing portion 50E is disposed between the gas generator 28 and the first tubular portion 40 and second tubular portion 42. A length direction intermediate portion of the discharge-path-securing portion 50E is curved so as to correspond to the shape of the boundary between first tubular portion 40 and the second tubular portion 42. In the present exemplary embodiment, the open-end-side portion 40A of the first tubular portion 40 is swaged such that part of the discharge-path-securing portion 50E is held between the ignition-device-storing portion 38 of the gas generator 28 and the cylinder 30. When the ignition-device-storing portion 38 partially deforms, discharge paths 46 (gaps) for discharging gas supplied into the second tubular portion 42 of the cylinder 30 are thus formed between the ignition-device-storing portion 38 of the gas generator 28 and the cylinder 30 (second tubular portion 42). The discharge-path-forming member 50 further includes a discharge-hole-inserted portion 50F that bends from the opposite end of the discharge-path-securing portion 50E to the catch portion 50A so as to extend toward the first tubular portion 40 side of the cylinder 30. The discharge-hole-inserted portion 50F is inserted into the discharge hole 44 formed in the first tubular portion 40.

The discharge-path-forming member 50 described above is inserted into the cylinder 30 from the first tubular portion 40 side thereof. In a state in which the catch portion 50A of the discharge-path-forming member 50 is caught on the stepped portion 42C of the second tubular portion 42, the discharge-hole-inserted portion 50F of the discharge-path-forming member 50 is inserted into the discharge hole 44 formed in the first tubular portion 40 to attach the discharge-path-forming member 50 to the cylinder 30. After the discharge-path-forming member 50 has been attached to the cylinder 30, the gas generator 28 is attached (fixed) to the cylinder 30.

Operation and Advantageous Effects of the Present Configuration

Explanation follows regarding the operation and advantageous effects of the configuration including the discharge-path-forming member 50.

Figure 12:
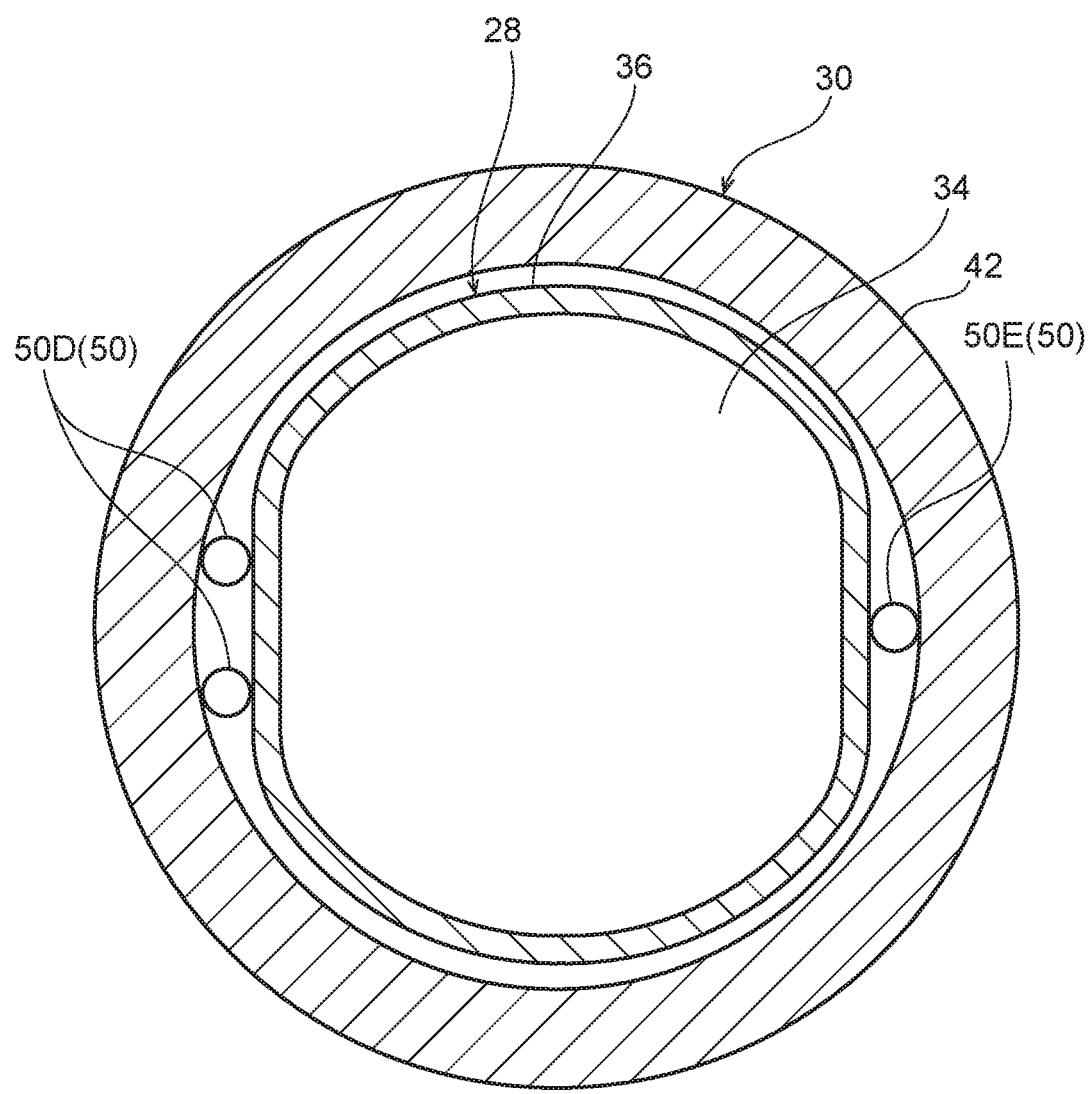
FIG. 12 is a cross-section illustrating a section of a cylinder, a gas generator, and a discharge-path-forming member taken along line 11-11 illustrated in FIG. 10.
Figure 13:
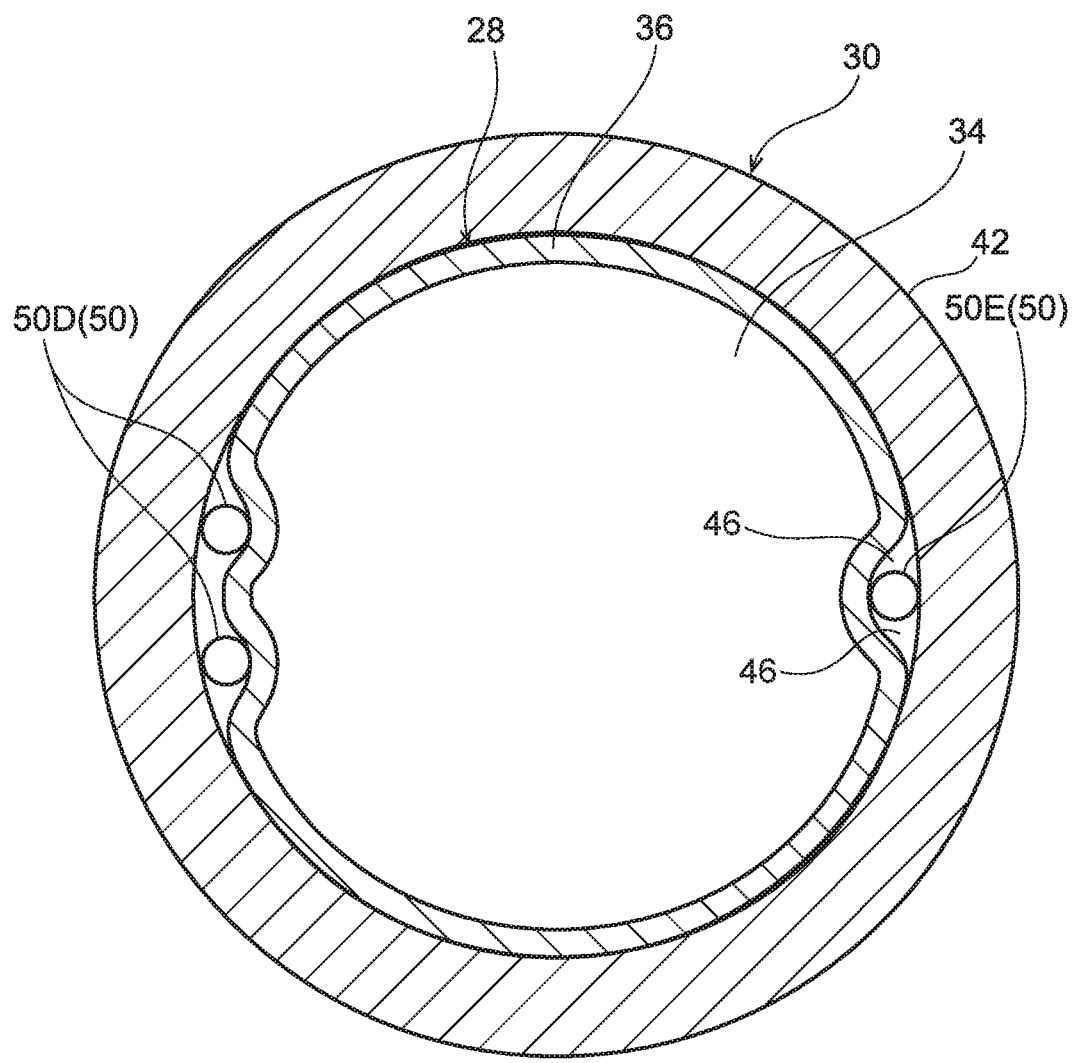
FIG. 13 is a cross-section corresponding to FIG. 12 illustrating a section of a cylinder, a gas generator, and a discharge-path-forming member after actuation of the gas generator.

As illustrated in FIG. 12, in a state before the gas generator 28 has been actuated, the outer circumferential face of the gas-generating-agent-storing portion 36 of the gas generator 28 is spaced apart from the inner circumferential face of the second tubular portion 42 of the cylinder 30. As illustrated in FIG. 13, the gas-generating-agent-storing portion 36 of the gas generator 28 expands when the gas generator 28 is actuated. The outer circumferential face of the gas-generating-agent-storing portion 36 of the gas generator 28 and the inner circumferential face of the second tubular portion 42 of the cylinder 30 are thus placed in close contact except for at portions where the U-shaped portion 50D and the discharge-path-securing portion 50E of the discharge-path-forming member 50 are interposed therebetween. A discharge path 46 (gap) for discharging gas supplied into the second tubular portion 42 of the cylinder 30 is formed at the portion where the discharge-path-securing portion 50E of the discharge-path-forming member 50 is interposed between the outer circumferential face of the gas-generating-agent-storing portion 36 of the gas generator 28 and the inner circumferential face of the second tubular portion 42 of the cylinder 30. Gas supplied from the gas generator 28 into the second tubular portion 42 is thus able to be discharged through this discharge path 46, a discharge path 46 formed between the ignition-device-storing portion 38 of the gas generator 28 and the second tubular portion 42 of the cylinder 30, and the discharge hole 44 formed in the first tubular portion 40.

In the present exemplary embodiment, in a state in which the discharge-path-forming member 50 is attached to the cylinder 30, the discharge-hole-inserted portion 50F of the discharge-path-forming member 50 is inserted into the discharge hole 44 formed in the first tubular portion 40. This allows the discharge-hole-inserted portion 50F of the discharge-path-forming member 50 to be seen from outside the cylinder 30. As a result, during the manufacturing process, it is easy to ascertain whether or not the discharge-path-forming member 50 is attached to the cylinder 30. Moreover, configuring the discharge-path-forming member 50 as an independent component enables the discharge-path-forming member 50 to be easily mass produced. Further, the size of the discharge paths 46 (gaps) for discharging gas supplied into the second tubular portion 42 of the cylinder 30 are able to be adjusted by adjustment of the wire diameter of the discharge-path-forming member 50.

Note that although the present exemplary embodiment was explained using an example in which the open-end-side portion 40A of the first tubular portion 40 is swaged to hold part of the discharge-path-securing portion 50E between the ignition-device-storing portion 38 of the gas generator 28 and the cylinder 30, the present invention is not limited thereto. Configuration may be such that by disposing part of the discharge-path-securing portion 50E within the depression portion 42B illustrated in FIG. 7, and so no part of the discharge-path-securing portion 50E is held between the ignition-device-storing portion 38 of the gas generator 28 and the cylinder 30.

Figure 14:
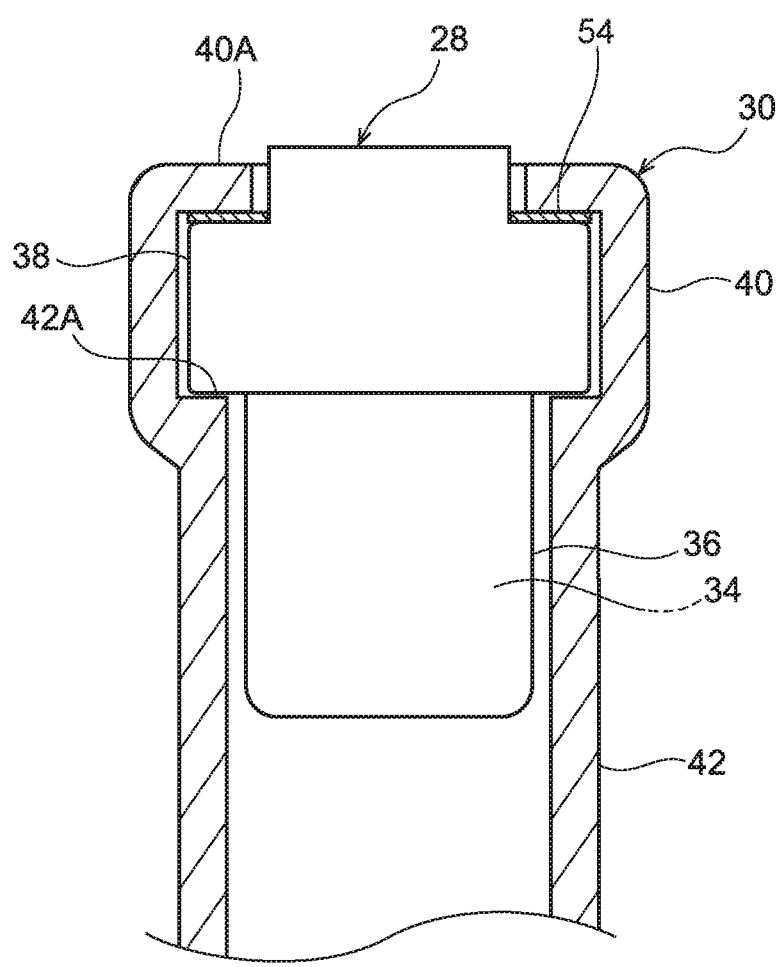
FIG. 14 is a cross-section illustrating a portion of a cylinder where a gas generator is attached.

Further, although the above configurations were explained using examples in which a discharge hole 44 is formed in the first tubular portion 40 and gas generated by the gas generator 28 is discharged through this discharge hole 44, the present invention is not limited thereto. For example, as illustrated in FIG. 14, configuration may be such that a thin sheet 54 made of metal and formed in a disc shape is interposed between the ignition-device-storing portion 38 of the gas generator 28 and the swaged portion open-end-side portion 40A of the first tubular portion 40 such that a slight gap, serving as a discharge portion, is formed between the thin sheet 54 and the ignition-device-storing portion 38. With such configuration, gas generated by the gas generator 28 is discharged through the slight gap formed between the thin sheet 54 and the ignition-device-storing portion 38.

Explanation has been given regarding exemplary embodiments of the present invention. However, the present invention is not limited to the above, and obviously various other modifications may be implemented within a range not departing from the spirit of the present disclosure.

The disclosure of Japanese Patent Application No. 2016-023499, filed on Feb. 10, 2016, is incorporated in its entirety by reference herein.

The invention claimed is:

1. A webbing take-up device comprising:
a spool that takes up webbing worn by an occupant by being rotated in a take-up direction; and
a pretensioner mechanism that includes a gas generator that includes a gas-generating-agent-storing portion in which a gas-generating agent is stored, and
an ignition-device-storing portion provided with an ignition device that ignites the gas-generating agent, a gas-generator-attached portion to which the gas generator is attached, and that includes a gas-supplied portion into which gas generated by the gas generator is supplied, and
a discharge portion that is provided to a portion of the gas-generator-attached portion where the ignition-device-storing portion is disposed, and through which gas supplied into the gas-supplied portion is discharged;
the pretensioner mechanism being configured to rotate the spool in the take-up direction due to actuation of the gas generator in a vehicle emergency,
wherein the gas-generator-attached portion includes a first tubular portion having an open end, an inner diameter of the first tubular portion being larger than an outer diameter of the ignition-device-storing portion,
wherein the ignition-device-storing portion is fixed in a state held between a swaged portion formed at the open end side of the gas-generator-attached portion and an end face on the first tubular portion side of the gas-supplied portion, and
wherein the gas-supplied portion is formed by a second tubular portion that abuts the ignition-device-storing portion, an inner diameter of the second tubular portion being smaller than the inner diameter of the first tubular portion,
characterized in that the discharge portion is formed in the first tubular portion, and in that a passage is formed between the end face on the first tubular portion side of the second tubular portion and the ignition-device-storing portion of the gas generator.

2. A webbing take-up device comprising:
a spool that takes up webbing worn by an occupant by being rotated in a take-up direction; and
a pretensioner mechanism that includes a gas generator that includes a gas-generating-agent-storing portion in which a gas-generating agent is stored, and
an ignition-device-storing portion provided with an ignition device that ignites the gas-generating agent, a gas-generator-attached portion to which the gas generator is attached, and that includes a gas-supplied portion into which gas generated by the gas generator is supplied, and
a discharge portion that is provided to a portion of the gas-generator-attached portion where the ignition-device-storing portion is disposed, and through which gas supplied into the gas-supplied portion is discharged;
the pretensioner mechanism being configured to rotate the spool in the take-up direction due to actuation of the gas generator in a vehicle emergency,
wherein at least one of the gas-generator-attached portion or the gas generator is provided with a discharge-path-forming portion that forms a discharge path through which gas supplied into the gas-supplied portion is passed to the discharge portion.

3. The webbing take-up device of claim 2, wherein:
the discharge-path-forming portion is configured by a depression portion formed in at least one of the gas-generator-attached portion or the gas generator; and
the discharge path is formed between the depression portion and either the gas generator or the gas-generator-attached portion.

4. A webbing take-up device comprising:
a spool that takes up webbing worn by an occupant by being rotated in a take-up direction; and
a pretensioner mechanism that includes a gas generator that includes a gas-generating-agent-storing portion in which a gas-generating agent is stored, and
an ignition-device-storing portion provided with an ignition device that ignites the gas-generating agent, a gas-generator-attached portion to which the gas generator is attached, and that includes a gas-supplied portion into which gas generated by the gas generator is supplied, and
a discharge portion that is provided to a portion of the gas-generator-attached portion where the ignition-device-storing portion is disposed, and through which gas supplied into the gas-supplied portion is discharged;
the pretensioner mechanism being configured to rotate the spool in the take-up direction due to actuation of the gas generator in a vehicle emergency,
wherein a discharge-path-forming member is provided between the gas generator and the gas-generator-attached portion to form a discharge path through which gas supplied into the gas-supplied portion is passed to the discharge portion.

5. The webbing take-up device of claim 4, wherein:
the discharge portion is configured by a discharge hole through which the inside and the outside of the gas-generator-attached portion are in communication; and
at least a portion of the discharge-path-forming member is disposed spanning from the gas-supplied portion to the discharge hole.

* * * * *